United States Patent [19]

Marshall et al.

[11] 4,393,695
[45] Jul. 19, 1983

[54] MANUAL SHIFT SYSTEM AND METHOD OF USE FOR VEHICLE TESTING

[75] Inventors: Richard A. Marshall; Edward F. Miller, both of Indianapolis, Ind.

[73] Assignee: Laboratory Equipment Corp., Mooresville, Ind.

[21] Appl. No.: 191,868

[22] Filed: Sep. 29, 1980

[51] Int. Cl.³ .......................................... G01M 15/00
[52] U.S. Cl. ................................................. 73/117.3
[58] Field of Search ...................... 73/117.3, 118, 117

[56] References Cited

U.S. PATENT DOCUMENTS

| | | | |
|---|---|---|---|
| 2,279,409 | 4/1942 | Milster et al. | 73/128 |
| 3,050,994 | 8/1962 | Heigl et al. | 73/117 |
| 3,516,287 | 6/1970 | Masuda et al. | 73/117 |
| 3,662,593 | 5/1972 | Pirrello et al. | 73/132 |
| 3,713,332 | 1/1973 | Herrbrich | 73/117 |

Primary Examiner—Jerry W. Myracle
Attorney, Agent, or Firm—Woodward, Weikart, Emhardt & Naughton

[57] ABSTRACT

A remote, manual shift system cooperating with the clutch, throttle and gear shift stick of a manual transmission vehicle for use during engine testing includes a series of five sensors, one each for vehicle speed, throttle position, clutch position, X-axis gear shift position and Y-axis gear shift position. These five sensors are operable to record and compile actual drive test data reflecting the actual operation of the vehicle during the test drive. This data is recorded and the recording is then processed by an electronics circuit which in turn provides actuating signals of a DC voltage level to a series of servos which are arranged in mechanical combination with the clutch, throttle and gear shift stick of the vehicle under test. As these various servos are actuated with an appropriate input signal, they perform the shifting from one gear to the next gear along with proper depression of the clutch and acceleration by means of the throttle. The use of actual test data from an actual road test provides a more reliable and improved data package for the operation of the servos and results in a more desirable vehicle test, such as might be performed on a dynamometer test station.

6 Claims, 10 Drawing Figures

MANUAL SHIFT SYSTEM AND METHOD OF USE FOR VEHICLE TESTING

BACKGROUND OF THE INVENTION

This invention relates in general to remotely actuated, manual shift systems for use with vehicle engine testing. In particular, this invention relates to such systems which respond to actual driving data on a real-time basis by means of servo mechanisms.

Engine testing wherein various-sized gasoline and diesel engines are evaluated often necessitates the shifting of gears between periods of throttle acceleration for those vehicles having manual transmissions. Dynamometer systems are one example of engine and vehicle testing systems which require actual operation of the engine or vehicle as part of the testing and evaluation.

Although remotely controlled systems are known to exist for automating the manual shifting of gears, these systems respond to preprogrammed input signals which do not represent actual driving conditions. Nor do such signals represent the timing and shifting of gears by an actual driver of the vehicle which is to be subjected to further testing. Further, such systems often incorporate fixed drive systems which are only capable of two-position movement.

It would be an improvement to such systems to be able to compile data from an actual driving test which reflects the timing and shifting response of an actual driver relative to particular road conditions and the particular vehicle. This actual data would then be used during engine and vehicle testing in order to control the operation of the clutch, throttle and gear shift in a manner identical to the actual test drive. It is felt that such actual driving data, which exactly duplicates road test conditions and which is applied in a real time manner, results in more accurate data and a truer set of test results regarding the operation of the vehicle.

Further, it would be an improvement to known systems to eliminate the limitation of two-position movement and replace these types of systems with electromechanical servo arrangements in order to improve the system.

The present invention provides each of these improvements as well as others, all of which will be apparent from the following descriptions.

SUMMARY OF THE INVENTION

A remote, manual shift system cooperating with the clutch, throttle and gear shift stick of a manual transmission vehicle for use during engine testing comprises a first servo system cooperatively arranged with the gear shift stick of the vehicle for shifting movement of the gear shift stick, a second servo system cooperatively arranged with the clutch of the vehicle for operating the clutch at appropriately timed points relative to the shifting movement, a third servo system cooperatively arranged with the throttle of the vehicle for acceleration between shifting movements and signal input means coupled to the first, second and third servo systems for providing to each of these servo systems data input signals for operation of the vehicle.

One object of the present invention is to provide an improved, remote, servo-controlled manual shift system.

Related objects and advantages of the present invention will be apparent from the following descriptions.

DESCRIPTION OF THE PREFERRED EMBODIMENT

Figure 1:
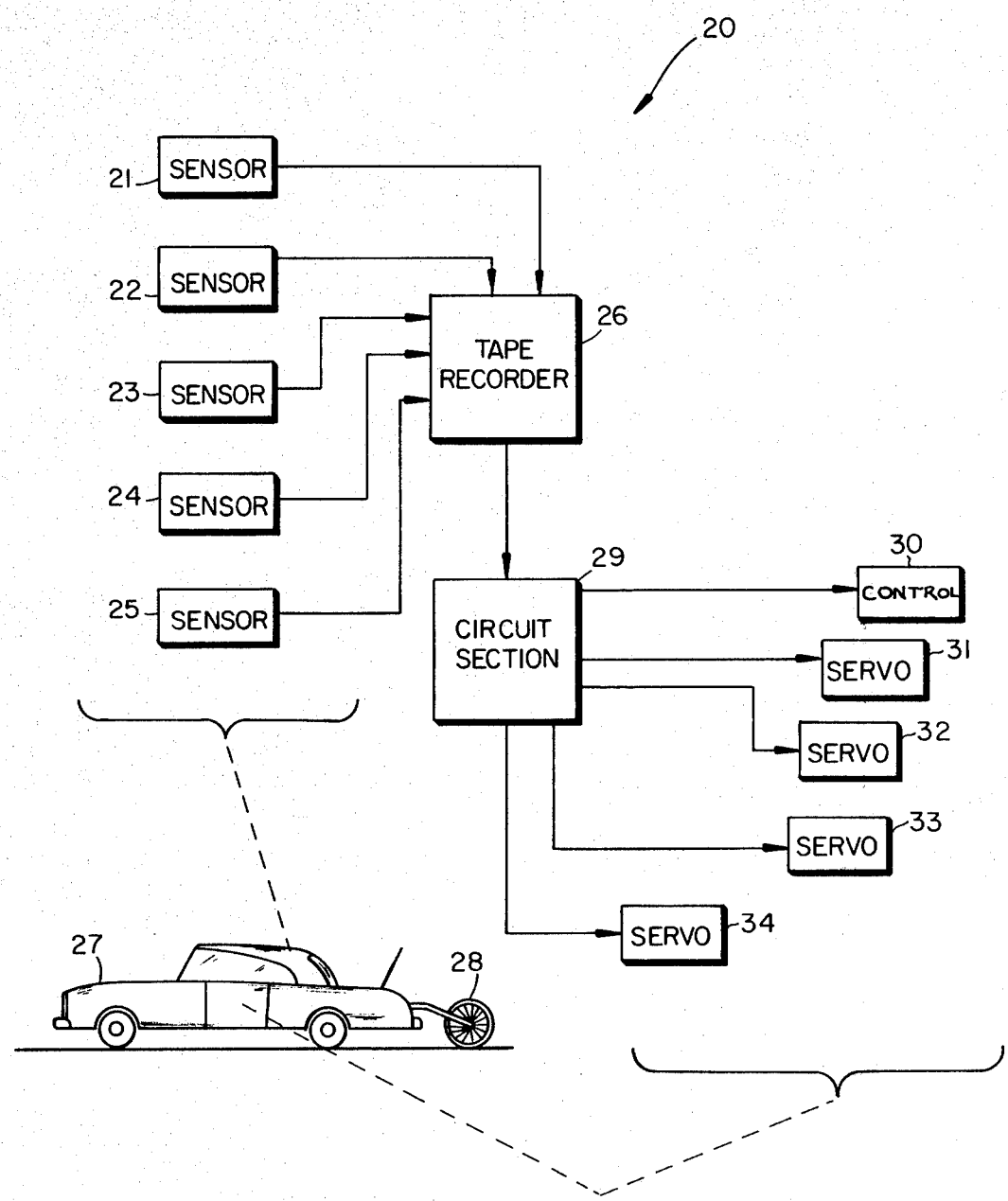
FIG. 1 is a block diagram and diagrammatic representation of a remote, manual shift system cooperating with the clutch, throttle and gear shift stick of a manual transmission vehicle which is also arranged with a series of sensors according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a block diagram of a remote, manual shift system 20 which provides a two-stage or two-part data collection and data-utilization concept. This manual shift system is cooperatively arranged with the clutch, throttle and gear shift stick of a manual transmission vehicle and is associated with vehicle testing by such means as, for example, a dynamometer test station.

The two-stage concept referred to for system 20 involves a first stage of data collection by means of sensors 21-25 and then utilization of this collected data in order to control the operation of various servo mechanisms and arrangements. Each of the five sensors collects a different element of data, all of which is input to a four-channel tape recorder. In order to get five channels of data on the four-channel recorder, a time-share multiplexer is used in order for two channels of data to be shared on one recorder channel.

Sensor 21 records the speed of vehicle 27 by means of fifth wheel 28, and the form of the data collected is a digital frequency. Sensor 22 senses throttle position as an actual test drive is conducted and this data is in the form of an analog voltage. Sensor 23 records clutch position as the test drive is conducted and this data form is also an analog voltage. Sensors 24 and 25 record X-axis and Y-axis gear shift stick positions, respectively, and these data forms are also analog voltages. These various sensors are all mechanically arranged with their corresponding component parts of the vehicle 27 under test, and by first conducting an actual test drive, the sensed data reflects actual driving conditions and actual driver response. The data is compiled and stored by means of tape recorder 26 for providing this true-life simulation of the kinds of driving conditions to which the vehicle is actually subjected. Road conditions may also be sensed and recorded in order to incorporate these types of conditions into any subsequent dynamometer test of the vehicle. Sensors 22-25 are located within the interior of vehicle 27.

The second stage of the system illustrated in FIG. 1 involves subsequent utilization of the data which was collected from the actual drive and stored by means of tape recorder 26. This second stage includes an electronics console 29 which receives the tape-recorded data from tape recorder 26 and in turn selects the appropriate data signals from the composite set of data and couples these data signals to an appropriate one of five different locations over different data transmission lines. Vehicle speed from vehicle speed sensor 21 is coupled to dynamometer control 30. Throttle position data from sensor 22 is coupled to throttle servo 31. Similarly, data regarding the clutch position from sensor 23 is provided to clutch servo 32. Finally, the X-axis gear shift position data and the Y-axis gear shift position data from sensors 24 and 25, respectively, are input to gear shift servo 33 and gear shift servo 34, respectively. Each of the five sensors and the servo mechanisms disclosed in only block diagram form in FIG. 1 are illustrated in greater detail by the drawings which follow. Servos 31-34 are located within the interior of vehicle 27.

Figure 2:
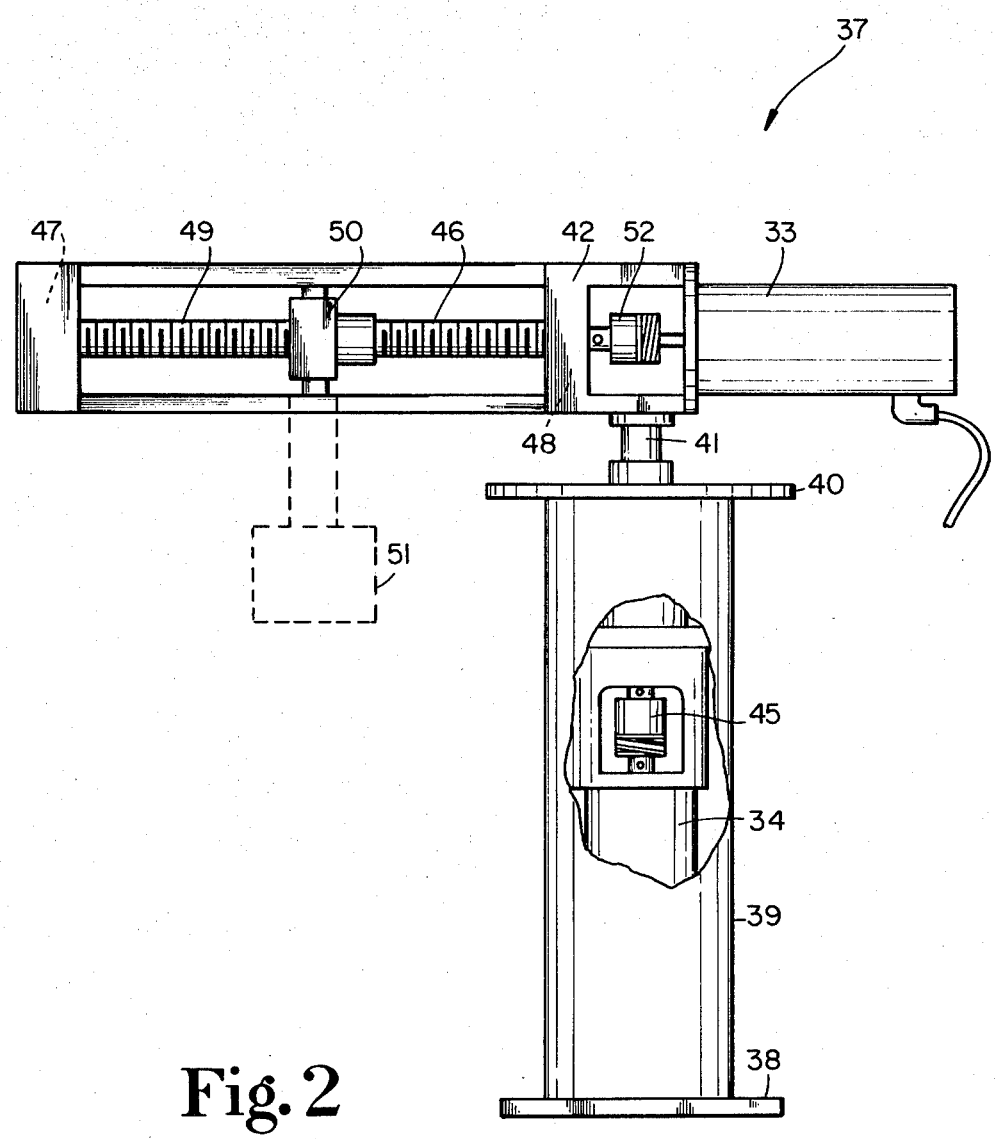
FIG. 2 is a fragmentary, front elevation view of a tow-axis servo-driven linkage arrangement comprising a portion of the FIG. 1 system.

Referring to FIG. 2, there is illustrated a two-axis gear shift subassembly 37 which includes X-axis gear shift servo 33 and Y-axis gear shift servo 34. Gear shift subassembly 37 includes a substantially flat base plate 38 which is provided with a plurality of mounting holes for securing the entire subassembly to the floor of the particular vehicle in which it is placed or to an intermediate mounting plate which is in turn secured to the vehicle. Rigidly joined to mounting plate 38 is a cylindrical housing 39 which terminates in a larger diameter top plate 40 which is provided with a plurality of mounting holes and this aspect of top plate 40 is illustrated in greater detail in FIG. 7. Extending through top plate 40 and coaxially aligned and connected to the output shaft of Y-axis gear shift servo 34 is a drive shaft 41 which rigidly attaches to cross member 42. Drive shaft 41 and servo 34 are coupled together by means of a clutch-like slip coupling 45 which is rated at 20 ounce inches.

Servo 33 is rigidly attached to cross member 42 at one end and extending through the center of this cross member is a ball screw assembly 46 whose ends are bearing supported at locations 47 and 48 within cross member 42. As servo 33 is operated, lead screw 49 rotates in either a clockwise or counterclockwise direction thereby accounting for the lateral movement of mounting block 50. Rigidly attached to mounting block 50 is support arm 51 which is only illustrated in broken line form in order to provide greater drawing clarity at this point. This particular component part is detailed in FIG. 3 and it is to be understood that this member has a slotted upright portion which fastens to mounting block 50 and is vertically adjustable by means of this slotted construction. The lower and outwardly extending portion of support arm 51 includes a cylindrical member which is cooperatively arranged with the gear shift stick for mechanical movement of the gear shift stick.

X-axis gear shift servo 33 which is rigidly attached to cross member 42 is mechanically and coaxially coupled to lead screw 49 by means of clutch-like slip coupling 52 which is rated at 12 ounce inches. As should be understood from the FIG. 2 illustration, the gear shift subassembly provides two directions of movement. The first direction of movement is rotational around a vertical axis which is coaxial with the output shaft of sevo 34 and drive shaft 41. The second type of movement is in a horizontal direction by means of the movement of mounting block 50, and in turn movement of support arm 51 across lead screw 49. The mechanical linkages disclosed are each capable of converting rotary motion into linear travel.

Servo 34 which provides the movement around a vertical axis requires a plus or minus 2½ volts DC input and has a resulting output of 10 pounds force and is capable of 360 degrees travel. Within the minus 2½ to plus 2½ volts DC range, zero is considered neutral. Similarly, servo 33 requires an input voltage of between zero and plus 2½ volts DC and has an output response of 10 pounds force and is capable of a maximum travel of 10 inches. The rate of travel is approximately 10 inches per second. By means of slip couplings 45 and 52, each corresponding servo is able to be driven in a continuous manner. This continuous driving is important due to the fact that these servos are DC in nature and could burn up once the gear shift stick was moved to a stopped position and could be moved no further in that same direction. When such a gear-shifting stop is encountered, although the servos continue to be driven, the slip couplings permit slip movement and do not permit the motors to burn up. The advantage of using the slip couplings in combination with DC motors which are continuously driven is that the servo loop of the motor is never lost and thus, these servos (motors) are all constantly on and their servo loop is maintained.

The two degrees of movement provided by subassembly 37 provide the complete movement to the gear shift for putting the gear shift stick through all the forward speeds. While rotational movement for the gear shift stick is not required, as is provided by servo 34, it is to be understood that the combination of both servos and their associated linkages working together are able to move support arm 51 which is in combination with the stick shift such that the gear shift stick is able to be moved through a typical H-pattern. In this H-pattern, the entire crossing section is neutral. An added safeguard of the disclosed system is provided by a power-off condition wherein if all power is lost, all settings go to zero and in the zero mode, the clutch is depressed and the gear shift stick is placed on the left side of this neutral band.

Figure 3:
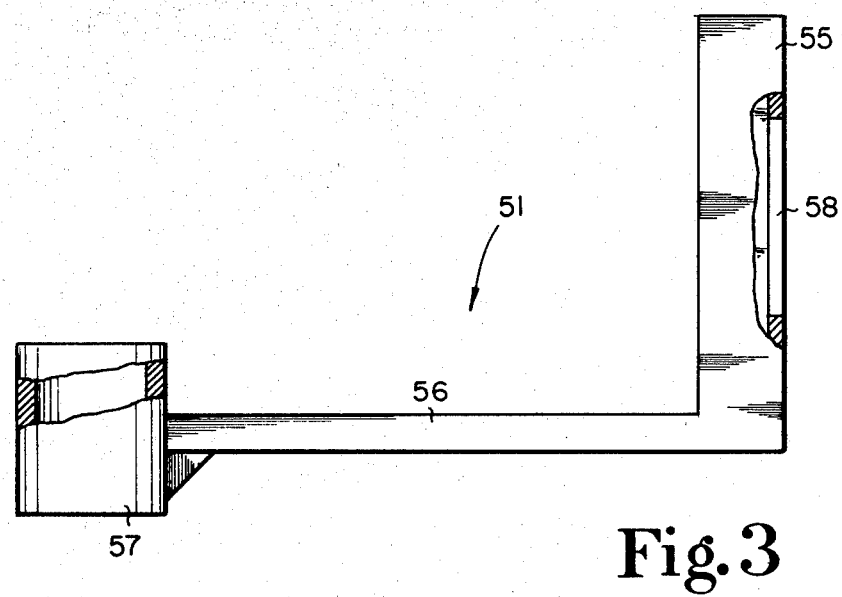
FIG. 3 is a fragmentary, side elevation view of a shift lever arm comprising a portion of the FIG. 2 arrangement.
Figure 4:
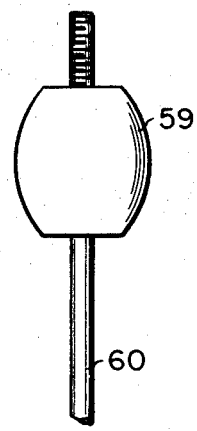
FIG. 4 is a front elevation view of a gear shift stick modification for providing shifting compatibility with the FIG. 3 lever arm.

Referring to FIGS. 3 and 4, support arm 51 is illustrated in greater detail and in FIG. 4, the gear shift stick is illustrated with a particularly styled attachment. Support arm 51 includes an upright, vertical portion 55 and an outwardly extending horizontal portion 56. At the end of the horizontal portion is a cylindrical sleeve 57 which is rigidly attached to horizontal portion 56. Further, horizontal portion and the vertical portion may be joined together by a number of suitable techniques. What is important is that they are rigidly secured together so that the entire support arm acts as a single, integral member. In the back wall of vertical portion 55 is a vertically running, oblong slot 58 which is centrally located top to bottom and side to side. Slot 58 is utilized with conventional threaded fasteners to attach to mounting block 50 which is internally threaded or alternatively provided with threaded inserts. Slot 58 enables the entire support arm to be raised or lowered in a vertical direction so that cylindrical sleeve 57 may be properly fitted around attachment 59 which is rigidly secured onto gear shift stick 60 (see FIG. 4). Attachment 59 is a part-spherical member which is secured to the gear shift stick and provides, by means of its exterior surface a type of rolling or universal motion within cylindrical sleeve 57. This type of rolling or universal motion is required due to the fact that support arm 51 is disposed as part of system 20 as it is illustrated in FIG. 3. This particular arrangement places the axis of cylindrical sleeve 57 in a vertical orientation. However, when the gear shift stick is moved from one gear to another, it actually moves in a type of arc or top-to-bottom circular sweep and it is thus required for its outer surface to be curved as illustrated in order to move within cylindrical sleeve 57 without interference.

Figure 5:
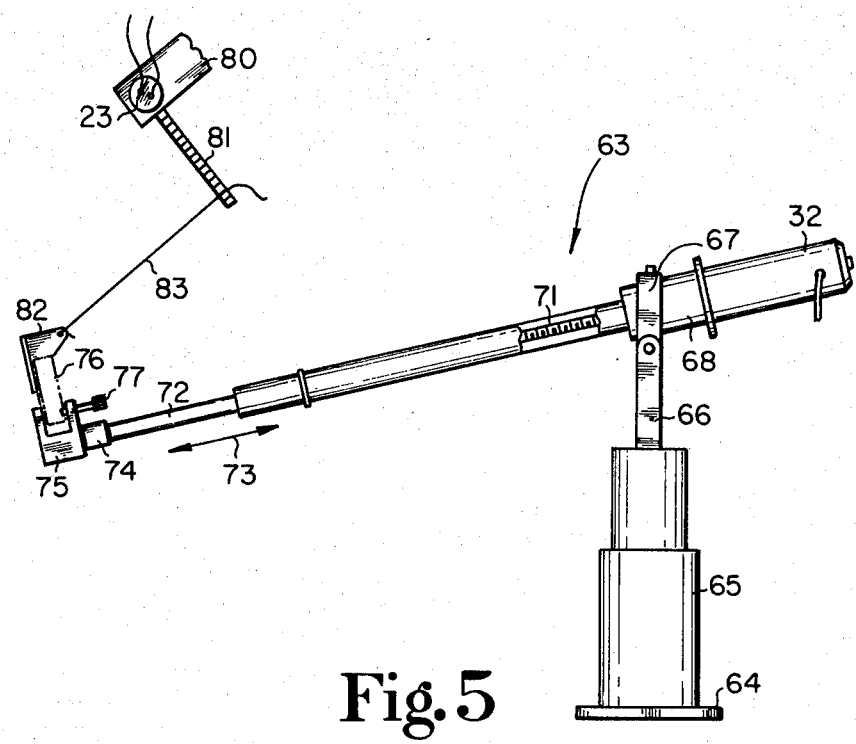
FIG. 5 is a servo-controlled, clutch-actuation arrangement comprising a portion of the FIG. 1 system.

Due to the fact that any remote, manual shift system must provide actuation of the clutch, FIG. 5 is an illustration of a clutch subassembly 63 which incorporates the use of clutch servo 32. Clutch subassembly 63 includes a substantially flat mounting plate 64 to which a telescoping type of cylindrical housing 65 is attached. Secured to the top end of the cylindrical housing is an upwardly opening U-shaped bracket 66 which is adapted to assemble with a downwardly opening U-shaped bracket 67. These two brackets cooperate with gimbal mechanism 68 in order to provide virtually universal movement of this subassembly. This particular arrangement thus enables subassembly 63 to be mounted in a proper orientation relative to the floor of the vehicle, by means of mounting plate 64, and thereafter be configured to properly cooperate with clutch pedal 76.

Clutch subassembly 63 also includes a ball screw assembly 71 which provides very rapid travel to plunger 72 in the direction of arrow 73. Secured to the end of plunger 72 is a type of universal mechanism 74 and a clamp 75. Clamp 75 is fitted around the clutch pedal 76 and is locked in place by two adjustable fasteners 77. The rapid response induced into plunger 72 in the direction of arrow 73 can be appreciated by understanding the parameters of servo 32. This clutch servo operates on an input signal of between zero and 2½ volts DC and provides an output of 70 pounds force with a maximum travel of 10 inches and a rate of travel of 15 inches per second. When an energizing signal is received by the clutch servo, the entire subassembly mechanism responds very rapidly in order to simulate quick clutch depression.

Also illustrated in FIG. 5 is the attachment mechanism for one of the five sensors 21-25 which were illustrated in block diagram form in FIG. 1. The particular sensor illustrated is the clutch pedal position sensor 23 which is assembled to mounting plate 80 and has an adjustable arm 81 coupled to its output shaft. In order to utilize sensor 23, bracket 82 is rigidly secured to clutch pedal 76 and bracket 82 is coupled to adjustable arm 81 by means of a flexible connecting member 83. The particular details of sensor 23 and its mechanical arrangement with adjustable arm 81, bracket 82 and the flexible connecting member 83 is illustrated in typical representative form in FIG. 6.

Figure 6:
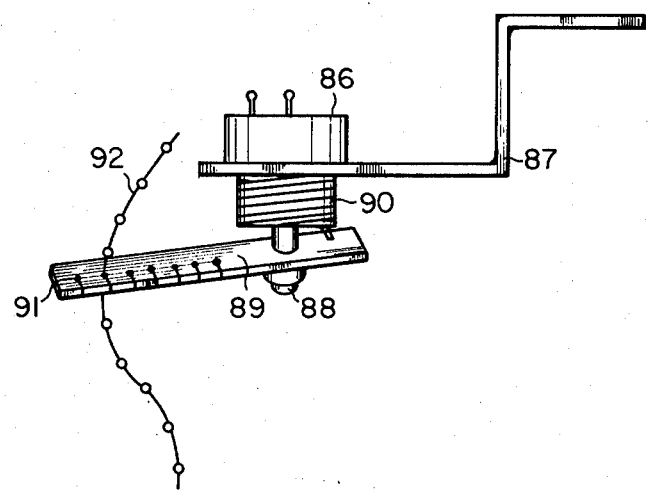
FIG. 6 is a side elevation view of a typical potentiometer sensor arrangement comprising a portion of the FIG. 1 system.

However, it is to be understood that the FIG. 6 illustration is only representative of one possible configuration for the mechanical linkage associated with the various sensors. What is important to understand from the FIG. 6 illustration is the relationship between the sensor, its output shaft, a spring tension member, the adjustable arm and the flexible connecting member. What is not critical is the particular style or shape of the mounting plate or bracket to which the sensor is assembled. The reason for this lack of criticality as to the mounting plate or bracket is that this particular member may be varied or may need to change, depending upon the vehicle component part with which the sensor is used and specifically how one chooses to assemble and position the sensor for signal pickup.

In this regard, the referenced numeral call-outs for FIG. 6 are to be treated as typical for each sensor location and assembly. Sensor 86 is representative of one of the group of sensors 21-25 and this typical sensor is assembled to mounting bracket 87. The output shaft 88 of sensor 86 extends through mounting bracket 87 and is clamped to adjustable arm 89. A spring tension member 90 is disposed between adjustable arm 89 and the underside of bracket 87 and this spring is held in position and is joined to both the adjustable arm and the bracket so that movement of the adjustable arm either decreases or increases the spring tension, depending upon the direction of movement. The adjustable arm is provided with a series of slots 91 inwardly extending from one edge of the adjustable arm. Received by one of the plurality of slots is a flexible member 92 which is of a ball and link chain-type design and may be either metal or plastic. This flexible member extends between the vehicle component part such as the clutch pedal and the adjustable arm so that movement of the vehicle part creates rotary movement in the adjustable arm which in turn creates movement in output shaft 88 and provides an electrical signal via sensor 86.

As can be appreciated from the FIG. 5 illustration where one particular sensor the clutch position was illustrated, when the clutch is manually depressed, the adjustable arm moves in a rotating manner and this places a certain angular movement in the output shaft. When the clutch is released, the return of the adjustable arm to its prior position is achieved by spring member 90. The use of flexible member 92 and the series of slots 91 in the adjustable arm permit the user of the disclosed system a wide variety of positioning and assembly options and permits varying of the tension between the vehicle component being sensed and the FIG. 6 sensor subassembly.

It is to be understood that the disclosed sensors remain in the vehicle throughout the data collection and signal input sequences associated with the vehicle under test. These sensors serve as servo feedback elements to provide real-time position information.

Figure 7:
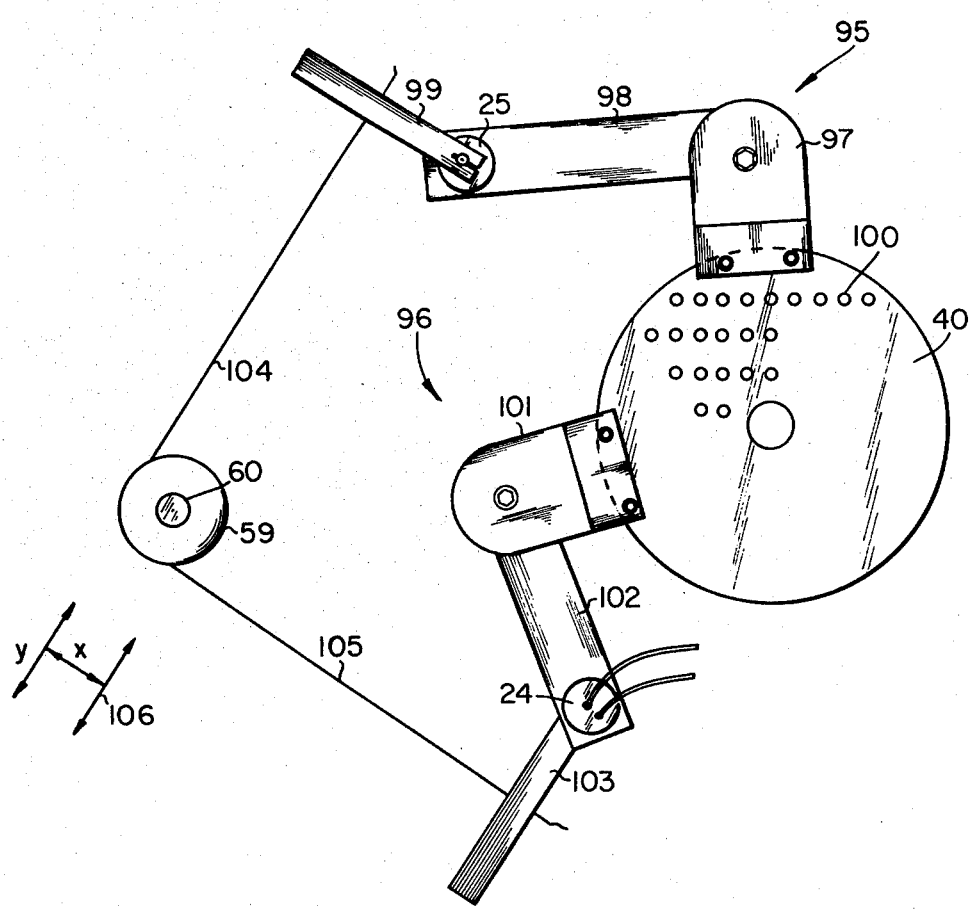
FIG. 7 is a partial, top plan view of the FIG. 2 arrangement with linkage arms and sensors attached and cooperatively coupled to a gear shift stick.

Additional sensor arrangements are illustrated in FIG. 7 and it is to be understood that the cross member of gear shift subassembly 37 has been removed in order to provide greater drawing clarity. What is illustrated is top plate 40 in combination with two sensor subassemblies 95 and 96. Sensor subassembly 95 includes a first mounting bracket 97 which is rigidly attached to top plate 40 by means of conventional threaded fasteners. Joined to first mounting bracket 97 is a sensor mounting plate 98 which receives sensor 25. Sensor 25 is mounted on the far side of sensor mounting plate 98 so that the output shaft of sensor 25 is illustrated and is rigidly attached to adjustable arm 99. Sensor mounting plate 98 is adjustably assembled to first mounting bracket 97 so that certain positioning arrangement options are possible. Further, top plate 40 is provided with a plurality of mounting holes 100 so that first mounting bracket 97 may be assembled in a variety of locations relative to this top mounting plate.

Sensor subassembly 96 has a very similar construction and also includes a first mounting bracket 101, sensor mounting plate 102, sensor 24 and adjustable arm 103. Each adjustable arm is coupled to gear shift stick 60 by means of corresponding flexible members 104 and 105 and a clamp disposed on the gear shift stick. As should be understood from the previous discussion regarding these types of sensor subassemblies, as the gear shift stick is moved through its sequence of gear positions, adjustable arms 99 and 103 are moved in a corresponding manner and their movement in turn rotates the output shaft of the corresponding sensor thereby generating a corresponding electrical signal. As has been indicated, these sensors create an analog voltage signal which is coupled to a tape recorder, or other data-storage means, in order to record actual movement of vehicle component parts during an actual test drive. Consequently, as the driver of the vehicle manually moves the gear shift through, for example, the four forward speeds, these two sensors pick up the corresponding movements and record that data for future use. In order to provide pure X and pure Y movement, it is important that the linkage arrangement in each of the sensor subassemblies be positioned with respect to each other at a right angle. Such right-angle relative positioning enables the front-to-back and left-to-right movement of the gear shift stick to be sensed by the appropriate adjustable arm so that the collected data is in a more usable form.

H-pattern diagram 106 represents this type of X-component and Y-component movement wherein sensor 25 corresponds to movement in the Y-axis direction and sensor 24 corresponds to movement in the X-axis direction.

Figure 8:
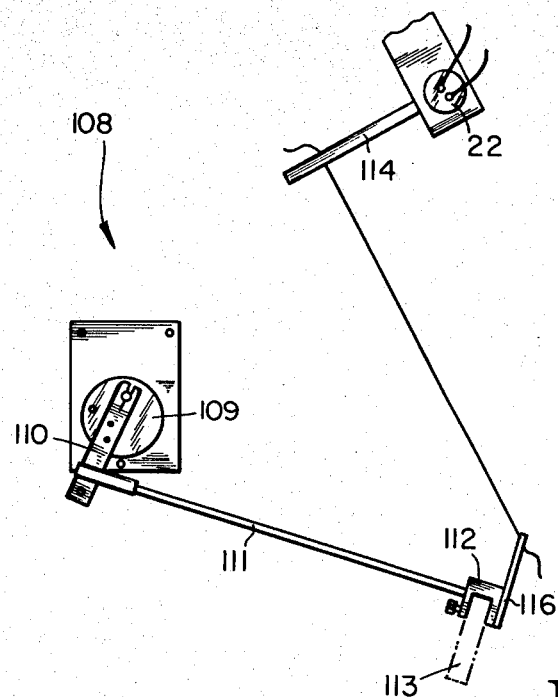
FIG. 8 is a side elevation view of a throttle-actuator system cooperatively attached to the throttle and comprising a portion of the FIG. 1 system.

Referring to FIG. 8, throttle actuator subassembly 108 is illustrated. This subassembly includes a drive/-gear unit 109 whose output shaft is coupled to linkage arm 110 which is attached by means of a pivotal connection to shaft 111 which in turn is clamped by means of clamp member 112 to the throttle pedal 113. Also coupled the throttle pedal is sensor 22 which is coupled thereto by means of adjustable arm 114, flexible member 115 and bracket 116. The operation of this type of sensor subassembly has already been adequately disclosed in the foregoing material and it is only to be understood that the operation of this particular subassembly is virtually the same as the other sensor subassemblies. Due to the fact that vehicle acceleration is a requisite of vehicle operation as one goes through the various vehicle forward speeds, it is important that some mechanism such as this throttle actuator system be provided. A suitable throttle actuator system for use as part of the exemplary embodiment is a model number 304 offered by Laboratory Equipment Corp. of Mooresville, Ind. It is important to note that operation of the throttle actuator system provides depression of the throttle pedal at the appropriate times and for the appropriate intervals. If the vehicle is being driven for collection of actual test drive data, then the operator's actuation of the throttle pedal provides the necessary signal inputs to sensor 22 which in turn provides signals to the tape recorder.

The various sensors which have been described as employed in the various sensor subassemblies are all potentiometer-type, rotary sensors and a suitable product for the exemplary embodiment application is an Econopot part number 78CAB102-C1B offered by New England Instrument Company of Natick, Mass.

Figure 9:
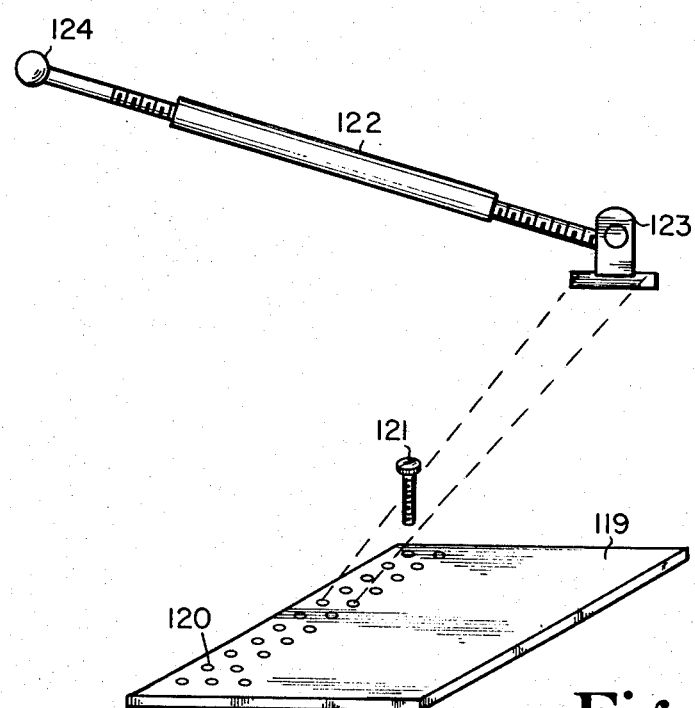
FIG. 9 is a perspective view of a mounting plate arrangement suitable for use with the FIG. 2 and FIG. 5 arrangements for providing mounting stability within the vehicle.

Referring to FIG. 9, there is an additional concept disclosed regarding the present invention. As has been previously explained, the gear shifter subassembly and the clutch subassembly each included a base mounting plate and while this plate may be assembled directly to the floor area of the vehicle being tested, FIG. 9 offers an alternative concept. Illustrated in FIG. 9 is a base mounting plate 119 which includes a uniformly spaced plurality of mounting holes 120. By means of relatively large threaded fasteners such as bolt 121, the entire base plate may be rigidly secured to the floor area of the vehicle. Although the position for this base plate is thus fixed, the particular subassemblies may be mounted to it at a wide variety of positional orientations. Further, the plurality of mounting holes in base plate 119 enables bracing and support mechanisms to be mounted thereto in order to stabilize the overall mechanical arrangement. Such a stabilizing mechanism is illustrated by means of adjustable shaft 122 and pivot member 123. Pivot member 123 is arranged for attachment to the mounting holes of base plate 119 as illustrated by the broken lines. Thereafter, adjustable shaft 122 may be moved into desired orientation and threadedly adjusted into position so that there is a tight and very stable fit between an interior surface of the vehicle and member 123. For example, one possible use for adjustable shaft 122 and pivot member 123 is to place the ball 124 at the distal end of the adjustable shaft in direct contact with the front floor board area of the vehicle so as to provide forward bracing or stiffening to the subassembly which is mounted on base plate 119.

By providing two separate base plates 119, one for the clutch subassembly and one for the gear shift subassembly, a very unique result occurs. These base plates enable the entire remote manual shift system to be arranged for all types of vehicles, whether they are left-side driven or right-side driven. By structuring the various component parts as separate subassemblies and by the use of base plates 119, if the system is to be installed on a foreign auto which is equipped with right-side steering and operator controls, then the locations for the clutch subassemblies and the gear shift subassembly are made accordingly. Conversely, if the system is to be installed as part of an American-made auto wherein the driver is positioned on the left side, then the clutch subassembly and throttle system are placed on the left side of the automobile with the gear shift subassembly positioned on the right-hand side.

Figure 10:
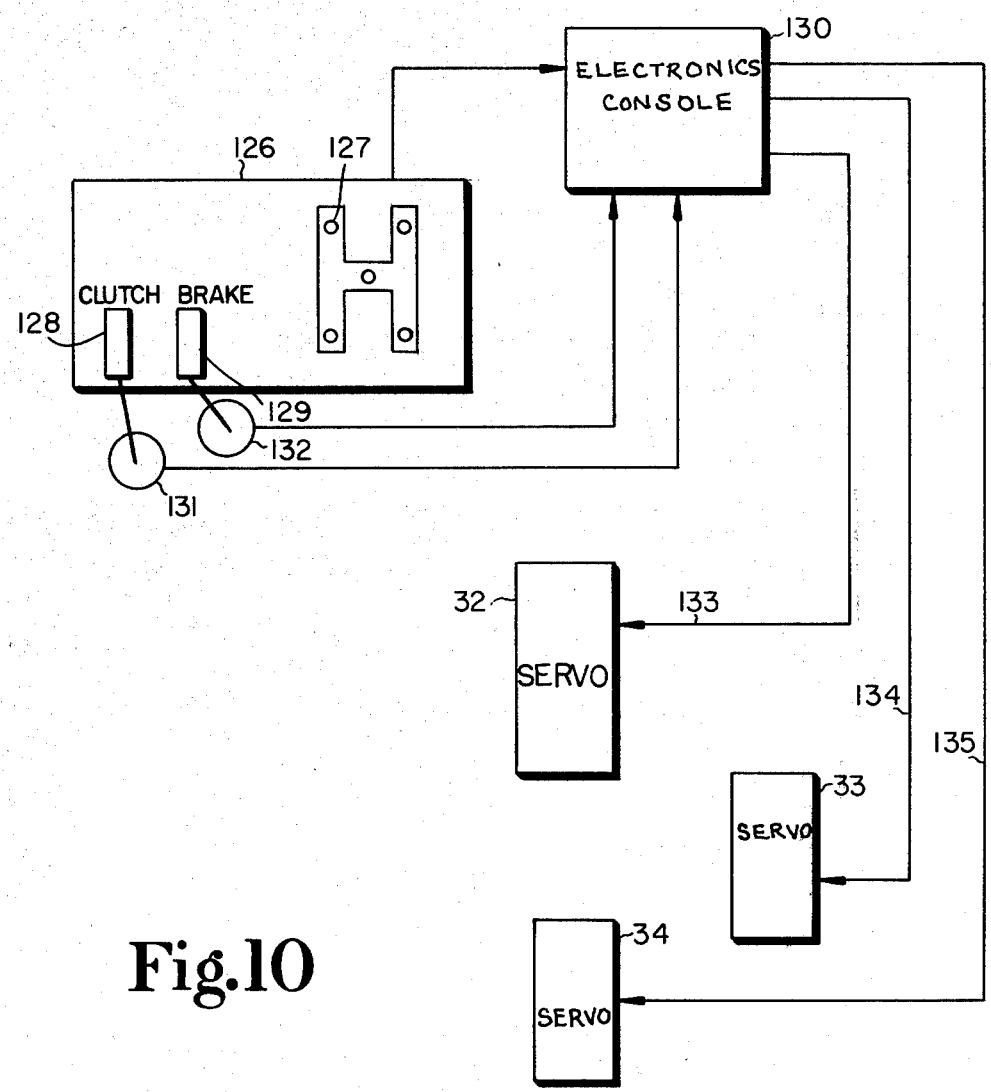
FIG. 10 is a block diagram of a manual shift, remote system which is suitable for providing input data from a remote point into the FIG. 1 system.

Referring to FIG. 10 an additional feature of the disclosed remote, manual shift system is illustrated. Tape-recorded data from an actual road test may either not be utilized or if available, may not be desired or needed for a particular test. In certain situations, it may be desirable to have the operator of the testing station manually perform the gear-shifting and clutch operation independently and remotely from the vehicle under test. The system diagrammatically illustrated in block diagram form in FIG. 10 provides such a remote operation capability.

This illustrated system includes an operator shift console 126 which includes a series of five pushbuttons 127, a clutch lever 128 and a brake lever 129. The five pushbuttons correspond to the four forward speeds of the vehicle under test and neutral. When the operator presses one of the pushbuttons, this preconditions circuitry and holds such circuitry in a ready condition until such time as the clutch lever is depressed. Depression of the clutch lever activates a command to electronics console 130 which generates a test signal indicating that the vehicle is to be shifted from its present gear shift position to the new gear shift position corresponding to the button pushed by the operator. The clutch lever and brake lever are each mechanically attached to a potentiometer-type, rotary sensor 131 and 132, respectively. When the electronics console 130 receives the appropriate clutch command from sensor 131, servo drive signals are generated at the output side of electronics console block 130. These output signals include a clutch command signal on line 133 coupling to clutch servo 32 which is part of clutch subassembly 63. The other two output data lines 134 and 135 couple to the X-axis gear shift servo 33 and the Y-axis gear shift servo 34, respectively. As a result of this cooperating system, an operator at the test station location is able to manually perform the gear shift movement as well as clutch and brake operation and to input the data regarding these movements and operation directly into the corresponding servos of the manual shift system associated with the vehicle under test.

The particular construction of electronics console 130 depends in part upon the particular vehicle and signal processing selected by the designer. Electronics console 130 includes appropriate logic circuitry in order to process the signals received from the operator shift console and converts these into a usable signal form for the various servos. Thus, what has been described is a remote, manual shift system which is operable in a variety of ways, each of which provides certain advantages. As has been described, one form of the invention includes a series of sensors cooperatively arranged with the operational components of the vehicle in order to compile data for an actual road test data tape. Thereafter, this tape may be subsequently used repeatedly for vehicle testing, whether independently or as part of a dynamometer test station. The tape-recorded data is processed and provided to a series of servos which are also cooperatively arranged within the test vehicle in order to achieve mechanical operation of certain vehicle components. An alternative approach is to empirically derive the test data and couple this data to the various servos. It is also possible to use computer generation of test data in lieu of a tape recorder and to program the computer in order for it to provide selected signal data and driving condition parameters. Yet another arrangement of the present invention involves the use of a remotely positioned operator console whereby the operator controls the shifting sequence and actuation of the clutch during the test of the vehicle. The commands from the operator are then processed and provided to the servos within the vehicle under test.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A remote, manual shift system cooperatively arranged with the clutch linkage and gear shift stick of a manual transmission vehicle for use during vehicle testing, said manual shift system comprising:
   a manual transmission test vehicle;
   means for generating a DC voltage signal;
   a first sensor assembly coupled to the throttle linkage of said vehicle and suitably arranged to respond to throttle linkage movements;
   a second sensor assembly coupled to the clutch linkage of said vehicle and suitably arranged to respond to clutch linkage movements;
   a dual rotary sensor assembly coupled to the gear shift stick of said vehicle, said dual rotary sensor assembly suitably arranged to record the X-axis component of the movement of the gear shift stick by first sensor means and the Y-axis component of the movement of the gear shift stick by second sensor means, said dual rotary sensor assembly thereby providing real-time position information of the gear shift stick;
   a clutch actuator subassembly mechanically coupled to the clutch linkage of said vehicle and suitably arranged to respond to a DC voltage signal from said generating means in order to move said clutch linkage;
   a throttle actuator subassembly mechanically coupled to the throttle linkage of said vehicle and suitably arranged to respond to a DC voltage signal from said generating means to move said throttle linkage;
   a gear shift actuator subassembly mechanically coupled to the gear shift stick of said vehicle and suitably arranged to respond to a DC voltage from said generating means signal to move said gear shift stick;
   data recording and processing means electrically coupled to said first and second sensor assemblies and to said dual rotary sensor assembly; and
   said gear shift actuator subassembly including a DC drive system, a linkage arm and a ball screw assembly suitably arranged for converting rotary motions from said DC drive system into linear travel of said linkage arm, said DC drive system disposed within said vehicle and being suitably adapted to respond to data input signals from said data recording and processing means for duplicating the real-time position movements of said gear shift stick.

2. The combination of claim 1 wherein said data recording and processing means includes a tape recorder and processing circuitry and wherein said input signals are analog voltages, and said first and second sensor assemblies each include a rotary sensor.

3. The combination of claim 2 and further comprising:
   a base for mounting said clutch, throttle and gear shift actuator subassemblies thereto, said base including a plurality of mounting holes in order that said subassemblies may be mounted in a variety of positional orientations.

4. The combination of claim 3 wherein said base includes first and second base plates, said first plate adapted for mounting said clutch actuator subassembly thereto, whereby said vehicle may be either left-side driven or right-side driven.

5. The combination of claim 4 which further includes a fifth wheel sensor coupled to said data recording and processing means and suitably arranged to reflect vehicle speed, said data recording and processing means processing said vehicle speed into a digital frequency signal.

6. A remote, manual shift system cooperatively arranged with the clutch linkage, throttle linkage and gear shift stick of a manual transmission vehicle for use during vehicle testing, said manual shift system comprising:

a manual transmission test vehicle;

means for generating a DC voltage signal;

first sensor means suitably arranged for responding to throttle linkage movements;

second sensor means suitably arranged for responding to clutch linkage movements;

third sensor means suitably arranged for recording the X-axis component of the movement of the gear shift stick by first sensing means and the Y-axis component of the movement of the gear shift stick by second sensing means, said third sensor means thereby providing real-time position information;

clutch actuator means responsive to DC voltage signals from said generating means for moving said clutch linkage;

throttle actuator means responsive to DC voltage signals from said generating means for moving said throttle linkage;

gear shift actuator means responsive to DC voltage signals from said generating means for moving said gear shift stick;

data recording and processing means coupled to said first, said second and said third sensor means; and said gear shift actuator means including a DC drive system, a linkage arm and movement means, said movement means being suitably arranged for converting rotary motions from said DC drive system into linear travel of said linkage arm, said DC drive system disposed within said vehicle and being suitably adapted to respond to data input signals from said data recording and processing means for duplicating the real-time position movements of said gear shift stick.

* * * * *